United States Patent

Wurz et al.

[11] Patent Number: 6,051,041
[45] Date of Patent: Apr. 18, 2000

[54] SEPARATION APPARATUS

[75] Inventors: Dieter Wurz, Baden-Baden; Stefan Hartig, Achern, both of Germany

[73] Assignee: Munters Euroform GmbH, Aachen, Germany

[21] Appl. No.: 08/996,381

[22] Filed: Dec. 22, 1997

Related U.S. Application Data

[63] Continuation-in-part of application No. 08/722,008, Oct. 2, 1996, abandoned.

[30] Foreign Application Priority Data

Feb. 6, 1995 [DE] Germany .......................... 195 03 842
Jan. 20, 1996 [WO] WIPO ..................... PCT/DE96/00079

[51] Int. Cl.$^7$ ................................................... B01D 45/08
[52] U.S. Cl. ............................... 55/315; 55/444; 55/463; 55/DIG. 25
[58] Field of Search ............................. 55/440, 442, 443, 55/444, 320, 321, 325, 318, 463, DIG. 25, 315

[56] References Cited

U.S. PATENT DOCUMENTS

| | | | |
|---|---|---|---|
| 877,460 | 1/1908 | Brunner et al. ........................... | 55/444 |
| 1,807,983 | 6/1931 | Hegan et al. .......................... | 55/444 X |
| 1,886,927 | 11/1932 | Williams ................................ | 55/444 X |
| 2,532,332 | 12/1950 | Rowand .................................... | 55/444 |
| 2,610,986 | 9/1952 | Brister .................................. | 55/444 X |
| 2,703,151 | 3/1955 | Glinka ................................... | 55/444 X |
| 2,956,641 | 10/1960 | Raub et al. .......................... | 55/444 X |
| 4,732,585 | 3/1988 | Lerner ................................... | 55/444 X |

FOREIGN PATENT DOCUMENTS

| | | |
|---|---|---|
| 969876 | 7/1958 | Germany . |
| 8536592 | 7/1986 | Germany . |
| 3535901 | 4/1987 | Germany . |
| 897417 | 5/1962 | United Kingdom ..................... 55/444 |

Primary Examiner—Richard L. Chiesa
Attorney, Agent, or Firm—Herbert Dubno

[57] ABSTRACT

An assembly for separating liquid and/or solid particles carried in a multi-phase stream. The assembly has a separator, especially a droplet separator. An agglomerating device is prearranged with respect to the separator and has at least two rows of rods onto which the stream flows at an angle, especially a right angle, to the rods' longitudinal axes. The rods in a given row are opposite the gaps in an adjacent row. The rods have a maximum width of 2–10 mm, and the agglomerating device is flown against with a flow velocity of 2 to 15 m/sec. The following separator can be formed with a significantly more simple design by the prearrangement of the agglomerating device.

10 Claims, 2 Drawing Sheets

SEPARATION APPARATUS

CROSS REFERENCE TO RELATED APPLICATIONS

This application is a continuation in part of application Ser. No. 08/722,008 filed Oct. 2, 1996, now abandoned, and is a National Stage of PCT/DE96/00079 filed Jan. 20, 1996 and based upon German National application 195 03 842.8 filed Feb. 6, 1995 under the International Convention.

FIELD OF THE INVENTION

The present invention relates to the separation of liquid and/or solid particles carried in a multi-phase stream with separating means comprising a separator.

BACKGROUND OF THE INVENTION

Means for separating particles from a stream are known. For the separation of liquid droplets so-called droplet separators are used which have a variety of structures. These are, for instance, packages consisting of corrugated plates. In order to obtain an especially high efficiency these droplet separators can have relatively complicated shapes. This is especially the case if relatively small liquid droplets are to be separated from the multi-phase stream. So, for instance, so-called lamellar separators are known which are formed extremely filigranely and thus are very costly to manufacture. Furthermore, with such droplet separators the encrustation risk is relatively high.

OBJECT OF THE INVENTION

The object of the present invention is to provide a separating means of the cited kind which enables an especially simple design of the separator, but yet with an especially high efficiency and with especially low energy consumption.

SUMMARY OF THE INVENTION

According to the invention this object is attained with a separator of the cited kind by the feature that an agglomerating device is prearranged with respect to the separator, said agglomerating device having at least two rows of rods onto which the stream flows at an angle, in particular at a right angle, to the longitudinal axes of the rods, the rods having a largest width of 2–10 mm. The rods in a given row are opposite the gaps in an adjacent row, and that the agglomerating device is flown against with a flow velocity of 2–15 m/sec.

The invention is based on the fundamental concept of enlarging the liquid anid/or solid particles contained in the multi-phase stream so that the same can be separated from the multi-phase stream in a following separator in a simplified manner (and with smaller energy consumption). Accordingly, the following separator can be constructed in a relatively simple manner. The increased additional expenditure at first sight by the agglomerating device upstream of the separator is compensated in any case by the obtained simplification with respect to the design of the following separator. The separator can be substantially coarser since it is traversed only by enlarged liquid and/or solid particles. Moreover, the susceptibility to encrustation is reduced hereby.

The agglomerating device provided according to the invention has the effect that fine drops and/or particles of the multi-stream agglomerate to rigid structures of the agglomerating device or agglomerate in flight to one another. The agglomerating device should not have the effect of a separator; in other words, the small droplets or particles which are primarily separated at the elements of the agglomerating device are immediately subsequently entrained by the gas stream so that they can be separated thereafter for instance in a conventional separator with lamellar structure.

In order to guarantee a true agglomerating function the agglomerating device is operated such that the flow onto it has a flow velocity of 2–15 m/sec. Accordingly, it can be operated with a relatively high flow velocity at the agglomerating device since no direct separation but only a droplet enlargement or particle enlargement is to be obtained which is to prepare an efficient separation. In contrast, normal droplet separators are operated with a smaller maximum flow velocity. If this will be exceeded a droplet entrainment will result which is undesired.

Another important feature of the invention is that the rods onto which the stream flows at an angle, in particular at a right angle, have a maximum width of 2–10 mm. It has been found that the desired agglomeration effect is the best within this range. With smaller widths of the rods than 2 mm the risk of encrustation increases strongly. Larger widths than 10 mm have the result that the agglomerating device operates as a droplet separator which is undesired. The separating function is to be taken over exclusively by the following separator or droplet separator.

Devices for agglomerating liquid and/or solid particles are known per se. For instance, such a device is described in DE 35 35 901 C2. This device contains substantially parallel separator plates according to the kind of mist eliminators with at least one deviation of the multi-phase stream. However, the manufacture of such agglomerating devices is relative expensive.

A device for agglomerating having at least two rows of rods onto which the stream flows at an angle, in particular at a right angle, to the rods' longitudinal axes, wherein the rods in a given row are opposite the gaps in an adjacent row, is known from DE 195 03 842 A1. However, in this publication no statements with regard to the maximum width of the rods are contained. Moreover, no statements are contained with respect to the fact with which flow velocity the agglomerating device has to be flown against. Finally, this publication does not disclose the combination of such an agglomerating device and a separator, especially a droplet separator.

The DE 85 36 592 U1 describes an air washer according to which round profiles or tubes are provided as droplet separator profiles wherein the tubes arranged thereafter in flow direction are disposed in front of the flow gaps of the forward row of tubes. Values of 110 mm and 125 mm are indicated for the diameters of the tubes. Accordingly, these tubes take over exclusively the function of a droplet separator as is also emphasized in this publication.

With the agglomeration concept of the invention realized according to which the agglomeratively acting elements can consist of simple members, for instance of semi-finished products, which is especially advantageous with regard to the fabrication technique. Surprisingly, it has been found that with such an agglomerating concept the droplets or particles do not move in a rectilinear (i.e. oblique) manner through the agglomerating device. The gas stream, even if flowing obliquely, rather aligns itself perpendicularly to the entrance plane and executes an especially narrowly curved path through the agglomerating device whereby an optimum agglomeration effect for particles and/or droplets is attained.

This is true not only for the agglomeration onto the rods but also for the agglomeration in a free flight condition.

Preferably, the rods of the agglomerating device are formed as round rods. Such round rods are especially simple members, i.e. the substantially simplest semi-finished products, so that the agglomerating device can be made especially economically. The outer diameter of the round rods amounts to 2–10 mm.

The relations of the characteristic dimensions should be adjusted in such manner that the stream indeed follows a path through the rods having the greatest possible number of curves. An especially preferred embodiment of the invention, in which this feature is optimized, is characterized by the feature that the diameters of all the rods of the rows 1 to n as well as the spacings $s_1$ to $s_n$ and $e_1$ to $e_n-1$ are identical and wherein the following relations apply:

$$e/s = 0.3-0.7$$

$$D/S = 2-10$$

with the following meanings:
s=spacing of the rods of one row
e=spacing of the rods of adjacent rows.
Especially good results are achieved if e/s is 0.5.

According to another embodiment of the invention the diameters $D_1$ to $D_n$ of the rows of rods 1 to n are different. Especially good results were achieved with an embodiment according to which the diameter $D_n$ of the last row of rods is 0.7 to 0.95 times the diameter of the preceding row of rods $D_n-1$. Especially preferred is an embodiment having three rows of rods wherein the first two rows of rods have rods with identical diameter while the third row of rods has rods the diameters of which fulfil the above-cited condition.

With the embodiments of different rod diameters the spacing of the connection lines of the centers of the rows of rods $l_1$ to $l_n-1$ were kept constant. However, this is not obligatory.

According to another embodiment of the invention the last row of rods have elongated droplet-like profiles (cross section) defining channels which provide a diffusor configuration favorable for flow.

BRIEF DESCRIPTION OF THE DRAWING

The above and other objects, features, and advantages will become more readily apparent from the following description, reference being made to the accompanying drawing in which.

Figure 1:
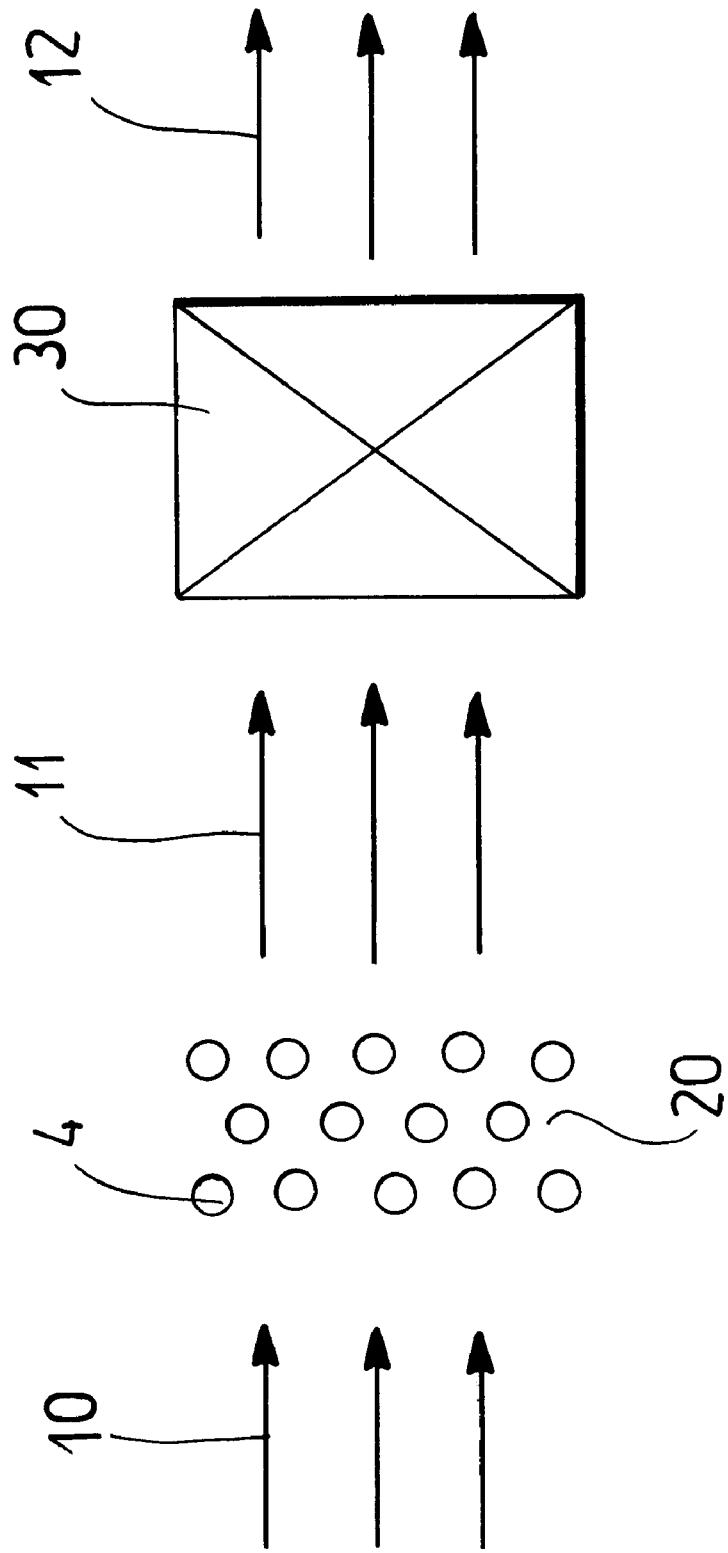
FIG. 1 is a schematic side view of a means or assembly for the separation of liquid and/or solid particles carried in a multi-phase stream comprising an agglomerating device and a droplet separator thereafter.

The assembly shown in FIG. 1 for the separation of particles carried in a multi-phase stream is here used for the separation of liquid droplets. The flow meets the agglomerator from the left side in the FIG. as shown at 10. The multi-phase stream reaches first the agglomerating device 20 consisting of three rows of round rods 4. While the rods of the first and third row are on the same level, the rods of the second row are located opposite the gaps of the rods of the first and third row. The exact construction of the agglomerating device is described in connection with FIG. 2.

The multi-phase stream leaves the agglomerating device 20 with agglomerated liquid particles. In other words, the multi-phase stream shown in FIG. 1 at 11 contains larger liquid particles than the stream shown at 10. The multi-phase stream 11 then enters a droplet separator schematically shown at 30, for instance a lamellar droplet separator. In this separator the droplets are separated from the stream so that the stream shown at 30 and leaving the droplet separator no longer contains a substantial quantity of liquid particles. The liquid droplets separated in the droplet separator 30 flow downwardly by gravity and are discharged by means of suitable installations (not shown).

Figure 2:
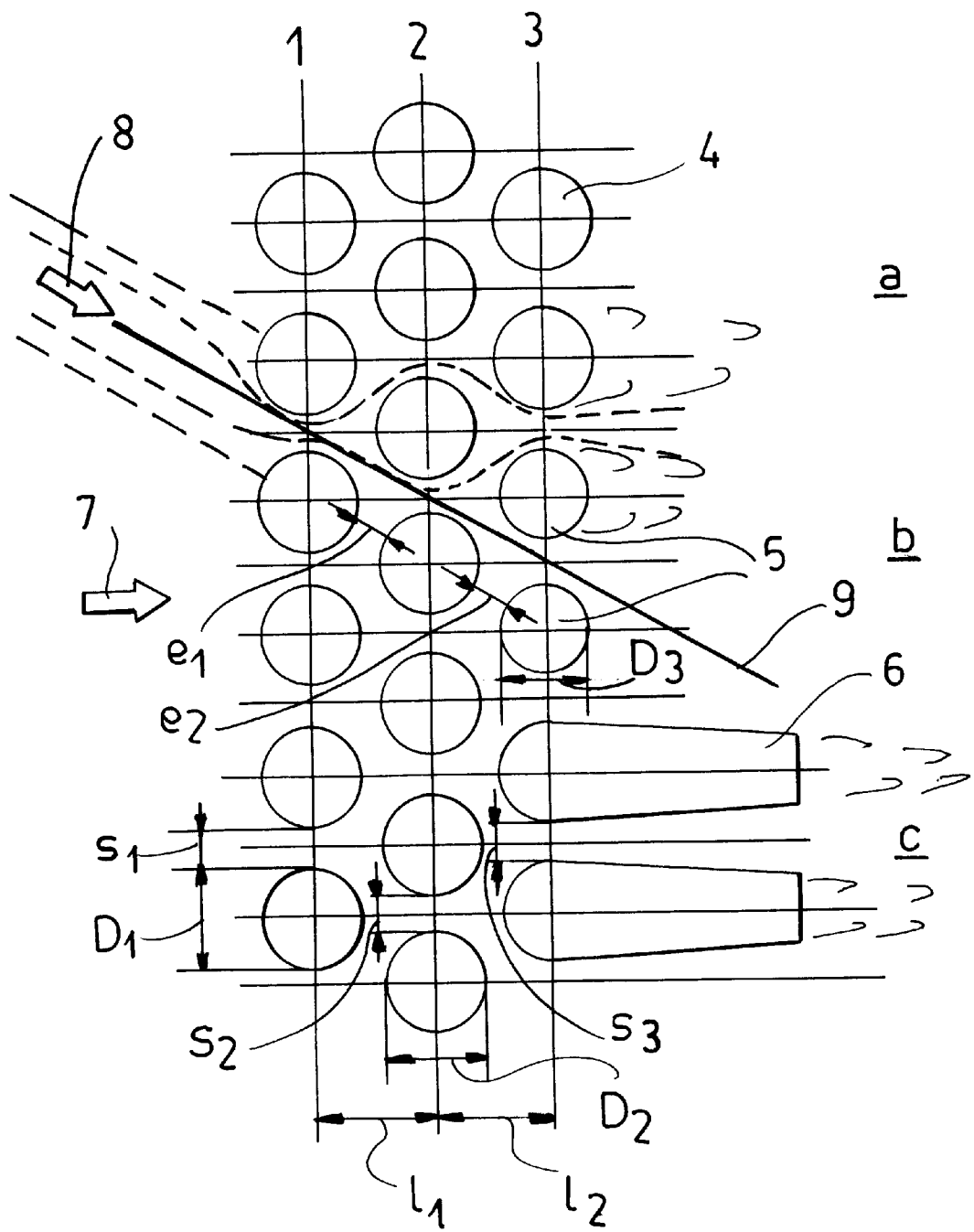
FIG. 2 is an enlarged schematic side view of the agglomerating device of FIG. 1.

FIG. 2 shows the construction of the agglomerating device 20 in detail. One recognizes the three rows 1, 2, 3 of the round rods 4. The mid-points of the rods of the second row are exactly located in the middle between the mid-points of two respective rods of the first and third row. The round rods 4 of the device have the same diameter which is 10 mm in this example. The velocity of the multi-phase stream directed against the agglomerating device is 10 m/sec.

The flow is directed to the device from the left side in FIG. 2, i.e. at a right angle to the axes of the round rods 4, as shown at 7, or at an oblique angle, as shown at 8.

With the oblique stream shown at 8 theoretically a rectilinear particle flight path through the device is possible, as shown at 9. However, this is not the case with the inventive embodiment. The gas stream rather aligns itself perpendicularly to the entrance plane and executes the illustrated narrow-curved path through the agglomerating device.

With the first embodiment of the device shown in portion a the round rods 4 of the first, second and third row have the same diameter. With the second embodiment shown in portion b the round rods of the first an second row have the same diameter while the round rods 5 of the third row have a smaller diameter. With the third embodiment shown in portion c the round rods of the first and second row have the same diameter. Instead of the round rods of the third row here slim profiles 6 are provided which are aerodynamically advantageous.

The reference signs used in the drawing have the following meanings:
$D_1$=diameter of the round rods of the first row.
$D_2$=diameter of the round rods of the second row.
$D_3$=diameter of the round rods of the third row.
$s_1$=distance between the round rods of the first row.
$s_2$=distance between the round rods of the second row.
$s_3$=distance between the round rods or profiles of the third row.
$e_1$=distance of the round rods of the first and second row.
$e_2$=distance of the round rods of the second and third row.
$l_1$=center distance of the round rods of the first and second row.
$l_2$=center distance of the round rods of the second and third row.

As mentioned above, with the embodiment shown in portion a all the rods of the rows which are located one behind the other opposite the gaps of the preceding row have the same diameter. In order to reach that the stream follows a path through the device having as many curves as possible, for this embodiment the following dimensioning rules apply:

$$D_1 = D_2 = D_3 = D$$

$$s_1 = s_2 = s_3 = s$$

$$e_1 = e_2 = e$$

e/s=0.3–0.7, preferably 0.5

D/s=2–10.

With the embodiment shown in portion b of the figure the simple basic member round rod has been maintained and a graduation of the rod diameter has been carried out. Only the rows 1 and 2 are formed with identical rod diameter ($D_1=D_2$), while the row 3 is formed with rods of a smaller diameter $D_3$. This is advantageous on account of the following reasons: When dimensioning according to the invention, the first and second row of rods already solve the problem to orthogonally align or to stabilize the flow field of the gaseous phase. The pressure loss of the agglomerating device can be significantly reduced by an appropriate dimensioning of the third row of rods. The high velocity at the close passage between adjacent rods of the second row would cause a significant flow outlet loss when freely blowing since the strongly divergent course of the cross-section necessarily causes burbling. Through an appropriate positioning of row 3 with slightly seller rod diameter it is achieved that the flow is delayed to a smaller velocity with a small loss of pressure corresponding to the larger distance $s_3>s_2=s_1$. It is advantageous to maintain, for instance, the following dimensioning rules:

$D_1=D_2$ $D_3=(0.7–0.95)\ D_1$.

Thereby, also for $l_1=l_2$ a defined variation of the length e ($e_2>e_1$) results.

With the third embodiment shown in portion c the round rods of the last row of rods are replaced by aerodynamically advantageous slim profiles 6. However, the circular rods of the rows 1 and 2 are maintained.

We claim:

1. An assembly for separating liquid and/or solid particles carried in a multi-phase stream, comprising:
   a separator; and
   an agglomerating device upstream of said separator and including at least two rows of rods onto which the stream flows at an angle to longitudinal axes of said rods, said rods having a maximum width of 2 to 10mm, the rods in a given one of said rows being opposite the gaps between rods of an adjacent row, the stream being directed against the agglomerating device with a flow velocity of 2 to 15 m/sec.

2. The assembly according to claim 1 wherein the rods are round rods.

3. The assembly according to claim 2 wherein the outer diameter of the round rods is 2 to 10 mm.

4. The assembly according to claim 3 wherein the diameters of all the rods of the rows 1 to n as well as distances $s_1$ to $s_n$ between rods of a row and $e_1$ to $e_{n-1}$ between rods of adjacent rows are identical, and wherein the following relations apply:

e/s=0.3 to 0.7

D/s=2 to 10, with the following meanings:
   D: diameter of the round rods
   s: spacing of the round rods of one row
   e: spacing of the round rods of adjacent rows.

5. The assembly according to claim 4 wherein e/s is 0.5.

6. The assembly according to claim 3 wherein diameters $D_1$ to $D_n$ of rods of the rows of rods 1 to n are different.

7. The assembly according to claim 6 wherein diameters $D_n$ of the rods of the last row of rods are 0.7 to 0.95 times as large as the diameters of the preceding row of rods $D_{n-1}$.

8. The assembly according to claim 7 wherein the spacings $1_1$ to $1_{n-1}$ of the connection lines of the centers of the rows or rods are constant.

9. The assembly according to claim 1 wherein a last row of rods consists of elongated droplet shaped profiles which define channels representing a diffusor configuration which is favorable for the flow.

10. The assembly defined in claim 1 wherein the stream is directed at a right angle to the longitudinal axes of the rods.

* * * * *